United States Patent
Esna Ashari Esfahani et al.

(10) Patent No.: US 12,304,512 B2
(45) Date of Patent: May 20, 2025

(54) DETECTING AND RESOLVING INFORMATION CONTRADICTIONS FOR A VEHICLE

(71) Applicant: GM Global Technology Operations LLC, Detroit, MI (US)

(72) Inventors: Alireza Esna Ashari Esfahani, Novi, MI (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 18/057,461

(22) Filed: Nov. 21, 2022

(65) Prior Publication Data

US 2024/0166223 A1    May 23, 2024

(51) Int. Cl.
*B60W 50/06* (2006.01)
*B60W 50/02* (2012.01)
*G05B 13/02* (2006.01)

(52) U.S. Cl.
CPC ........ *B60W 50/06* (2013.01); *B60W 50/0205* (2013.01); *G05B 13/0265* (2013.01); *B60W 2050/0215* (2013.01)

(58) Field of Classification Search
CPC ............. B60W 50/06; B60W 50/0205; B60W 2050/0215; B60W 50/023; B60W 50/0225; G05B 13/0265; G01S 13/867; G01S 13/931; G06V 20/56
See application file for complete search history.

(56) References Cited

U.S. PATENT DOCUMENTS

| | | | |
|---|---|---|---|
| 10,452,978 B2 | 10/2019 | Shazeer et al. | |
| 10,468,062 B1* | 11/2019 | Levinson | G01S 7/497 |
| 2014/0336866 A1* | 11/2014 | Kloeden | G08C 25/00 |
| | | | 701/30.3 |
| 2019/0333381 A1* | 10/2019 | Shalev-Shwartz | G05D 1/2437 |
| 2021/0216076 A1* | 7/2021 | Nayak | G06N 20/20 |
| 2022/0185316 A1* | 6/2022 | Zhang | G06V 10/454 |

OTHER PUBLICATIONS

U.S. Appl. No. 17/820,317, filed Aug. 17, 2022.

* cited by examiner

*Primary Examiner* — Aniss Chad
*Assistant Examiner* — Christine Nguyen Huynh
(74) *Attorney, Agent, or Firm* — Vivacqua Crane, PLLC (57) ABSTRACT

A system for resolving information contradictions in information received by a vehicle includes a plurality of vehicle sensors for receiving the information and a controller in electrical communication with the plurality of vehicle sensors. The controller is programmed to receive a first piece of information from a first of the plurality of vehicle sensors and receive a second piece of information from a second of the plurality of vehicle sensors. The controller is further programmed to determine a contradiction status between the first piece of information and the second piece of information. The controller is further programmed to resolve a contradiction between the first piece of information and the second piece of information using a third piece of information from a third of the plurality of vehicle sensors in response to determining that the contradiction status is a contradicting status.

20 Claims, 2 Drawing Sheets

DETECTING AND RESOLVING INFORMATION CONTRADICTIONS FOR A VEHICLE

INTRODUCTION

The present disclosure relates to systems and methods for processing information about an environment surrounding a vehicle, and more particularly, to resolving contradictions between information received by the vehicle.

Many vehicles today are equipped with advanced driver-assistance systems (ADAS) or automated driving systems. The aforementioned systems are generally designed to assist vehicle occupants in handling the vehicle by gathering a variety of information about the environment surrounding the vehicle and predicting or planning actions of the vehicle. The information about the environment surrounding the vehicle may be obtained using a variety of systems and methods, for example, using perception sensors installed in/on the vehicle and/or using communication between the vehicle and external systems (e.g., other vehicles and/or infrastructure). Therefore, a large volume of information about the environment surrounding the vehicle may be obtained. However, current systems and methods may fail to distinguish correct information when contradictory information about the environment surrounding the vehicle is received.

Thus, while current ADAS and automated driving systems achieve their intended purpose, there is a need for a new and improved system and method for resolving information contradictions for a vehicle.

SUMMARY

According to several aspects, a system for resolving information contradictions in information received by a vehicle is provided. The system includes a plurality of vehicle sensors for receiving the information and a controller in electrical communication with the plurality of vehicle sensors. The controller is programmed to receive a first piece of information from a first of the plurality of vehicle sensors and receive a second piece of information from a second of the plurality of vehicle sensors. The controller is further programmed to determine a contradiction status between the first piece of information and the second piece of information, where the contradiction status includes a contradicting status and a non-contradicting status. The controller is further programmed to resolve a contradiction between the first piece of information and the second piece of information using a third piece of information from a third of the plurality of vehicle sensors in response to determining that the contradiction status is the contradicting status.

In another aspect of the present disclosure, to determine the contradiction status, the controller is further programmed to determine the contradiction status between the first piece of information and the second piece of information using at least a contradiction detection algorithm.

In another aspect of the present disclosure, the contradiction detection algorithm is a transformer model machine learning algorithm.

In another aspect of the present disclosure, the plurality of vehicle sensors includes at least a microphone for receiving voice commands from an occupant of the vehicle, a camera for capturing images of an environment surrounding the vehicle, and a vehicle communication system for communicating with systems external to the vehicle.

In another aspect of the present disclosure, the first, second, and third pieces of information are at least one of a voice command from the occupant of the vehicle received using the microphone, an image of the environment surrounding the vehicle captured using the camera, and information retrieved from an external system using the vehicle communication system.

In another aspect of the present disclosure, to resolve the contradiction between the first piece of information and the second piece of information, the controller is further programmed to construct if-then clauses from one of the first piece of information and the second piece of information. To resolve the contradiction between the first piece of information and the second piece of information, the controller is further programmed to retrieve the third piece of information from the third of the plurality of vehicle sensors, where the third piece of information includes at least one of: an image of the environment surrounding the vehicle captured using the camera, information about a remote vehicle in the environment surrounding the vehicle retrieved using the vehicle communication system, and information retrieved from an external system using the vehicle communication system. To resolve the contradiction between the first piece of information and the second piece of information, the controller is further programmed to evaluate the if-then clauses using the third piece of information. To resolve the contradiction between the first piece of information and the second piece of information, the controller is further programmed to determine a truth score for each of the first and second pieces of information based on evaluating the if-then clauses using the third piece of information. To resolve the contradiction between the first piece of information and the second piece of information, the controller is further programmed to resolve the contradiction based on the truth score for each of the first and second pieces of information.

In another aspect of the present disclosure, to evaluate the if-then clauses, the controller is further programmed to evaluate the if-then clauses using an image of the environment surrounding the vehicle and a visual question answering algorithm.

In another aspect of the present disclosure, to evaluate the if-then clauses, the controller is further programmed to evaluate the if-then clauses using the information about the remote vehicle, where the information about the remote vehicle includes at least one of: a speed and a heading of the remote vehicle.

In another aspect of the present disclosure, to evaluate the if-then clauses, the controller is further programmed to evaluate the if-then clauses using the information retrieved from the external system, where the information retrieved from the external system includes at least one of: map data, driving law data, and vehicle operator manual data.

In another aspect of the present disclosure, to resolve the contradiction based on the truth score for each of the first and second pieces of information, the controller is further programmed to compare the truth score of the first piece of information to the truth score of the second piece of information. To resolve the contradiction based on the truth score for each of the first and second pieces of information, the controller is further programmed to determine the first piece of information to be true in response to determining that the truth score of the first piece of information is greater than the truth score of the second piece of information and that a difference between the truth score of the first piece of information and the truth score of the second piece of information is greater than or equal to a predetermined truth score difference threshold. To resolve the contradiction based on the truth score for each of the first and second pieces of information, the controller is further programmed to determine the second piece of information to be true in response to determining that the truth score of the second piece of information is greater than the truth score of the first piece of information and that the difference between the truth score of the first piece of information and the truth score of the second piece of information is greater than or equal to the predetermined truth score difference threshold. To resolve the contradiction based on the truth score for each of the first and second pieces of information, the controller is further programmed to prompt the occupant of the vehicle with the first piece of information and the second piece of information in response to determining that the difference between the truth score of the first piece of information and the truth score of the second piece of information is less than the predetermined truth score difference threshold.

According to several aspects, a method for resolving information contradictions for a vehicle is provided. The method includes receiving a first piece of information from a first of a plurality of vehicle sensors and receiving a second piece of information from a second of the plurality of vehicle sensors. The method also includes determining a contradiction status between the first piece of information and the second piece of information, where the contradiction status includes a contradicting status and a non-contradicting status. The method also includes resolving a contradiction between the first piece of information and the second piece of information using a third piece of information from a third of the plurality of vehicle sensors in response to determining that the contradiction status is the contradicting status.

In another aspect of the present disclosure, determining the contradiction status further may include determining the contradiction status between the first piece of information and the second piece of information using at least a transformer model machine learning algorithm.

In another aspect of the present disclosure, resolving the contradiction between the first piece of information and the second piece of information further may include constructing if-then clauses from one of the first piece of information and the second piece of information. Resolving the contradiction between the first piece of information and the second piece of information further may include retrieving the third piece of information from the third of the plurality of vehicle sensors, where the third piece of information includes at least one of: an image of an environment surrounding the vehicle captured using a camera, information about a remote vehicle in the environment surrounding the vehicle retrieved using a vehicle communication system, and information retrieved from an external system using the vehicle communication system. Resolving the contradiction between the first piece of information and the second piece of information further may include evaluating the if-then clauses using the third piece of information. Resolving the contradiction between the first piece of information and the second piece of information further may include determining a truth score for each of the first and second pieces of information based on evaluating the if-then clauses using the third piece of information. Resolving the contradiction between the first piece of information and the second piece of information further may include resolving the contradiction based on the truth score for each of the first and second pieces of information.

In another aspect of the present disclosure, evaluating the if-then clauses further may include evaluating the if-then clauses using an image of the environment surrounding the vehicle and a visual question answering algorithm.

In another aspect of the present disclosure, evaluating the if-then clauses further may include evaluating the if-then clauses using the information about the remote vehicle, where the information about the remote vehicle includes at least one of: a speed and a heading of the remote vehicle.

In another aspect of the present disclosure, evaluating the if-then clauses further may include evaluating the if-then clauses using the information retrieved from the external system, where the information retrieved from the external system includes at least one of: map data, driving law data, and vehicle operator manual data.

In another aspect of the present disclosure, resolving the contradiction based on the truth score for each of the first and second pieces of information further comprises comparing the truth score of the first piece of information to the truth score of the second piece of information. Resolving the contradiction based on the truth score for each of the first and second pieces of information further comprises determining the first piece of information to be true in response to determining that the truth score of the first piece of information is greater than the truth score of the second piece of information and that a difference between the truth score of the first piece of information and the truth score of the second piece of information is greater than or equal to a predetermined truth score difference threshold. Resolving the contradiction based on the truth score for each of the first and second pieces of information further comprises determining the second piece of information to be true in response to determining that the truth score of the second piece of information is greater than the truth score of the first piece of information and that the difference between the truth score of the first piece of information and the truth score of the second piece of information is greater than or equal to the predetermined truth score difference threshold. Resolving the contradiction based on the truth score for each of the first and second pieces of information further comprises and prompting an occupant of the vehicle with the first piece of information and the second piece of information in response to determining that the difference between the truth score of the first piece of information and the truth score of the second piece of information is less than the predetermined truth score difference threshold.

According to several aspects, a system for resolving information contradictions for a vehicle is provided. The system includes a plurality of vehicle sensors, where the plurality of vehicle sensors includes a microphone for receiving voice commands from an occupant of the vehicle, a camera for capturing images of an environment surrounding the vehicle, and a vehicle communication system for communicating with systems external to the vehicle. The system also includes a controller in electrical communication with the plurality of vehicle sensors. The controller is programmed to receive a first piece of information from a first of the plurality of vehicle sensors and receive a second piece of information from a second of the plurality of vehicle sensors. The controller is further programmed to determine a contradiction status between the first piece of information and the second piece of information using a transformer model machine learning algorithm, where the contradiction status includes a contradicting status and a non-contradicting status. The controller is further programmed to resolve a contradiction between the first piece of information and the second piece of information using a third piece of information from a third of the plurality of vehicle sensors in response to determining that the contradiction status is the contradicting status.

In another aspect of the present disclosure, to resolve the contradiction between the first piece of information and the second piece of information, the controller is further programmed to construct if-then clauses from one of the first piece of information and the second piece of information. To resolve the contradiction between the first piece of information and the second piece of information, the controller is further programmed to retrieve the third piece of information from the third of the plurality of vehicle sensors, where the third piece of information includes at least one of: an image of the environment surrounding the vehicle captured using the camera, information about a remote vehicle in the environment surrounding the vehicle retrieved using the vehicle communication system, and information retrieved from an external system using the vehicle communication system. To resolve the contradiction between the first piece of information and the second piece of information, the controller is further programmed to evaluate the if-then clauses using the third piece of information. To resolve the contradiction between the first piece of information and the second piece of information, the controller is further programmed to determine a truth score for each of the first and second pieces of information based on evaluating the if-then clauses using the third piece of information. To resolve the contradiction between the first piece of information and the second piece of information, the controller is further programmed to compare the truth score of the first piece of information to the truth score of the second piece of information, where one of the first and second pieces of information having a larger truth score is determined to be true in response to determining that a difference between the truth score of the first piece of information and the truth score of the second piece of information is greater than or equal to a predetermined truth score difference threshold, and where an occupant of the vehicle is prompted in response to determining that the first and second pieces of information have equal truth scores.

In another aspect of the present disclosure, to evaluate the if-then clauses, the controller is further programmed to evaluate the if-then clauses using at least one of: an image of the environment surrounding the vehicle and a visual question answering algorithm, the information about the remote vehicle, wherein the information about the remote vehicle includes at least one of: a speed and a heading of the remote vehicle, and the information retrieved from the external system, wherein the information retrieved from the external system includes at least one of: map data, driving law data, and vehicle operator manual data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure relates to resolving contradictions between multiple pieces of information received by a vehicle. A vehicle may include multiple sensors or inputs providing information about an environment surrounding the vehicle. Due to various factors, information received may be contradictory. Thus, a system and method are needed to resolve information contradictions for a vehicle.

Figure 1:
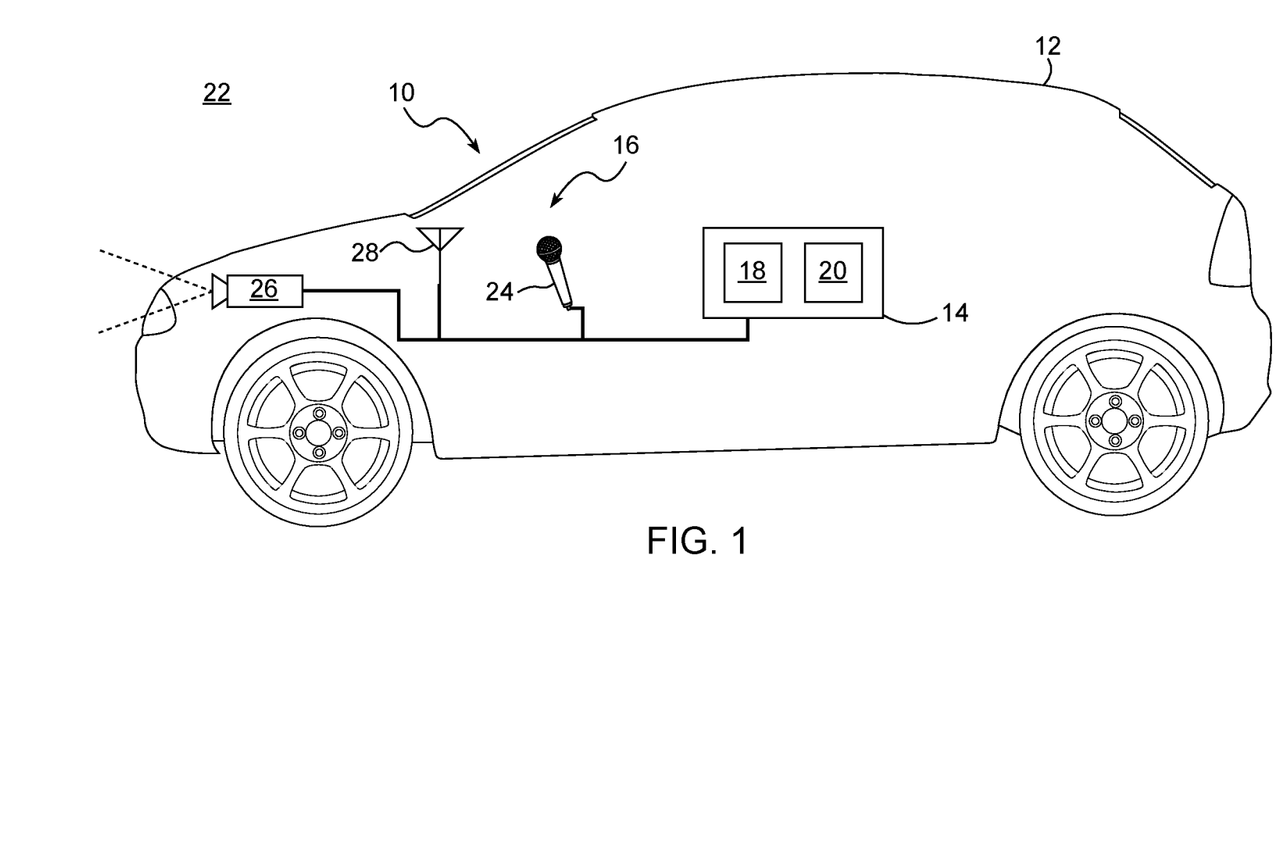
FIG. 1 is a schematic diagram of a system for resolving information contradictions for a vehicle according to an exemplary embodiment.

Referring to FIG. 1, a system for resolving information contradictions for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14 and a plurality of vehicle sensors 16.

The controller 14 is used to implement a method 100 for resolving information contradictions for a vehicle, as will be described below. The controller 14 includes at least one processor 18 and a non-transitory computer readable storage device or media 20. The processor 18 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 20 may include volatile and nonvolatile storage in read-only memory (ROM), random-access memory (RAM), and keep-alive memory (KAM), for example. KAM is a persistent or non-volatile memory that may be used to store various operating variables while the processor 18 is powered down. The computer-readable storage device or media 20 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The plurality of vehicle sensors 16 are used to determine information about an environment 22 surrounding the vehicle 12. In the exemplary embodiment depicted in FIG. 1, the plurality of vehicle sensors 16 includes a microphone 24, a camera 26, and a vehicle communication system 28. It should be understood that various additional sensors, such as, for example, a LiDAR sensor, a radar sensor, an ultrasonic distance sensor, a global navigation satellite system (GNSS), and the like may be included in the plurality of vehicle sensors 16 without departing from the scope of the present disclosure. The plurality of vehicle sensors 16 are in electrical communication with the controller 14 as described above.

The microphone 24 is used to receive voice commands by converting acoustic waves into electrical signals. In an exemplary embodiment, the microphone 24 includes a unidirectional dynamic microphone (i.e., a microphone which converts acoustic waves to electrical signals using electromagnetic induction) configured to receive voice commands from a specific occupant of the vehicle 12. In another exemplary embodiment, the microphone 24 includes a plurality of microelectromechanical systems (MEMS) microphones (e.g., a microphone having a pressure-sensitive diaphragm etched directly into a silicon wafer) disposed throughout a cabin of the vehicle 12 configured to receive voice commands. It should be understood that additional types of microphones which are configured to convert acoustic waves to electrical signals (e.g., digital and/or analog electrical signals) are included in the scope of the present disclosure.

The camera 26 is used to capture images and/or videos of the environment 22 surrounding the vehicle 12. In an exemplary embodiment, the camera 26 is a photo and/or video camera which is positioned to view the environment 22 in front of the vehicle 12. In one example, the camera 26 is affixed inside of the vehicle 12, for example, in a headliner of the vehicle 12, having a view through a windscreen of the vehicle 12. In another example, the camera 26 is affixed outside of the vehicle 12, for example, on a roof of the vehicle 12, having a view of the environment 22 in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 28 is used by the controller 14 to communicate with other systems external to the vehicle 12. For example, the vehicle communication system 28 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 28 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the 3 rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 28 may include one or more antennas and/or communication transceivers for receiving and/or transmitting signals, such as cooperative sensing messages (CSMs). The vehicle communication system 28 is configured to wirelessly communicate information between the vehicle 12 and another vehicle. Further, the vehicle communication system 28 is configured to wirelessly communicate information between the vehicle 12 and infrastructure or other vehicles.

In a non-limiting example, the plurality of vehicle sensors 16 receives multiple pieces of information about the environment 22 surrounding the vehicle 12. The multiple pieces of information received may contain information contradictions. For example, one piece of information received contains a speed limit of a roadway of sixty miles per hour, while another piece of information contains a speed limit of the roadway of thirty miles per hour, thus presenting an information contradiction.

Figure 2:
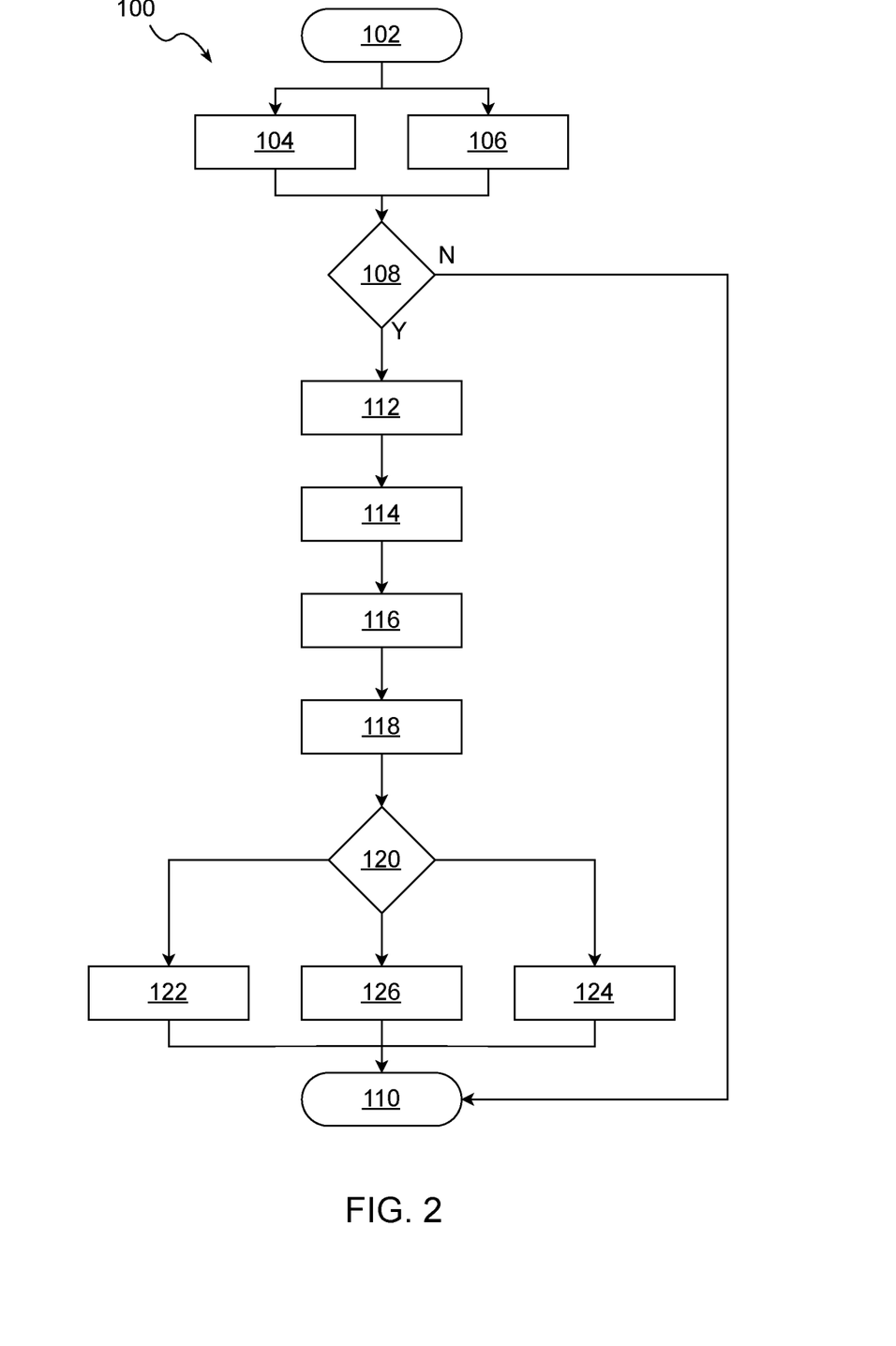
FIG. 2 is a flowchart of a method for resolving information contradictions for a vehicle according to an exemplary embodiment.

Referring to FIG. 2, the method 100 for resolving information contradictions for a vehicle begins at block 102 and proceeds to blocks 104 and 106. At block 104, the controller 14 receives a first piece of information from the plurality of vehicle sensors 16. In a non-limiting example, the first piece of information is an image of a road sign taken by the camera 26 indicating a speed limit. In another non-limiting example, the first piece of information is a first voice command received from the occupant of the vehicle using the microphone 24. In yet another non-limiting example, the first piece of information is a setting (e.g., a navigation routing preference such as avoiding highways) chosen by the occupant and stored in the media 20 of the controller 14.

At block 106, the controller 14 receives a second piece of information from the plurality of vehicle sensors 16. In a non-limiting example, the second piece of information is a speed measurement of a remote vehicle in the environment 22 surrounding the vehicle 12 measured using the plurality of vehicle sensors 16. In the scope of the present disclosure, the remote vehicle is any vehicle in the environment surrounding the vehicle 12. In an exemplary embodiment, the method 100 is performed with multiple remote vehicles in the environment surrounding the vehicle 12, for example, any remote vehicles detected by the plurality of vehicle sensors 16. In another non-limiting example, the second piece of information is information about a road configuration (e.g., locations of one-way streets) received using the vehicle communication system 28. In yet another non-limiting example, the second piece of information is a second voice command received from the occupant of the vehicle using the microphone 24.

It should be understood that any of the first piece of information and second piece of information may be data, measurements, messages and/or information received using the plurality of vehicle sensors 16 and/or otherwise accessed by the controller 14. In a non-limiting example, the first and/or second pieces of information include data from perception sensors of the plurality of vehicle sensors 16 (e.g., the camera 26, a LiDAR sensor, a radar sensor, and/or the like) including, for example, images, distance measurements, and/or velocity measurements. In another non-limiting example, the first and/or second pieces of information include communication messages received from remote vehicles, infrastructure, systems, and/or server computers using the vehicle communication system 28. After blocks 104 and 106, the method 100 proceeds to block 108.

At block 108, the controller 14 determines a contradiction status between the first piece of information and the second piece of information. In the scope of the present disclosure, the contradiction status indicates whether there is a contradiction between the first piece of information received at block 104 and the second piece of information received at block 106. A contradicting status indicates that the first and second pieces of information are contradicting, and a non-contradicting status indicates that the first and second pieces of information are not contradicting. In an exemplary embodiment, to determine the contradiction status, the controller 14 uses a contradiction detection algorithm. In a non-limiting example, the contradiction detection algorithm is a transformer model machine learning algorithm which is capable of learning which parts of the input data are important in order to increase accuracy (for example, as disclosed in U.S. Pat. No. 10,452,978, the entire disclosure of which is hereby incorporated by reference herein). Examples of transformer models include the Bidirectional Encoder Representations from Transformers (BERT) model and the Robustly Optimized BERT Pre-training Approach (RoBERTa). The transformer model is configured to evaluate textual entailment (i.e., an extent to which the first and second pieces of information are non-contradicting) using natural language processing (NLP). In a non-limiting example, the transformer model outputs a contradiction probability, an entailment probability, and a neutral probability. Based on the contradiction, entailment, and neutral probabilities, the controller 14 evaluates whether the first and second pieces of information are contradicting. In another non-limiting example, the controller 14 performs additional NLP tasks, such as, for example, negation detection (i.e., detecting negating words and phrases in the first and second pieces of information to determine the contradiction status), numerical mismatch detection (i.e., detecting mismatched numbers in the first and second pieces of information to determine the contradiction status), and antonymy detection (i.e., detecting words having opposite meaning in the first and second pieces of information to determine the contradiction status). The additional NLP tasks may be performed using machine learning algorithms or non-machine-learning based algorithms. If the contradiction status is determined to be the non-contradicting status, the method 100 proceeds to enter a standby state at block 110. If the contradiction status is determined to be the contradicting status, the method 100 proceeds to block 112.

At block 112, if-then clauses are constructed from one of the first and second pieces of information determined at blocks 104 and 106. In a non-limiting example, one of the first and second pieces of information includes an image of a road sign indicating parking rules (e.g., "No parking on Monday"). Therefore, the corresponding if-then clauses are, for example, "if the day is Monday, then no parking is allowed". In another non-limiting example, one of the first and second pieces of information includes an image of a road sign indicating driving rules (e.g., "Slow down when amber lights flashing", with the road sign including amber lights which may flash to indicate whether the sign is currently valid). Therefore, the corresponding if-then clauses are, for example, "if amber lights are flashing, then slow down". After block 112, the method 100 proceeds to block 114.

At block 114, the controller 14 retrieves a third piece of information from the plurality of vehicle sensors 16. It should be understood that the third piece of information may be data, measurements, messages and/or information received using the plurality of vehicle sensors 16 and/or otherwise accessed by the controller 14. In a non-limiting example, the third piece of information includes data from perception sensors of the plurality of vehicle sensors 16 (e.g., the camera 26, a LiDAR sensor, a radar sensor, and/or the like) including, for example, images, distance measurements, and/or velocity measurements. In another non-limiting example, the third piece of information includes communication messages received from remote vehicles, infrastructure, systems, and/or server computers using the vehicle communication system 28. In a non-limiting example, the third piece of information includes information about the remote vehicle such as a speed, a heading, and/or the like. In another non-limiting example, the third piece of information includes map data retrieved using the vehicle communication system 28 or a GNSS. In yet another non-limiting example, the third piece of information includes driving law data (e.g., a database of applicable driving laws). In yet another non-limiting example, the third piece of information includes vehicle operator manual data (e.g., data about features, capabilities, and proper use of the vehicle 12, such as may be contained in a vehicle operator manual). After block 114, the method 100 proceeds to block 116.

At block 116, the if-then clauses constructed at block 112 are evaluated using the third piece of information retrieved at block 114. In a non-limiting example, the first piece of information is an image of a road sign indicating driving rules (e.g., "Slow down when amber lights flashing", with the road sign including flashing amber lights). Therefore, the corresponding if-then clauses are, for example, "if amber lights are flashing, then slow down". The second piece of information is a speed measurement of a remote vehicle in the environment 22 surrounding the vehicle 12. In the non-limiting example, the first and second pieces of information are contradicting because the first piece of information indicates that vehicles should slow down, and the second piece of information indicates that the remote vehicle has not slowed down. In the non-limiting example, the third piece of information is a plurality of interpretations of the road sign from a plurality of remote vehicles obtained by communicating with the plurality of remote vehicles using the vehicle communication system 28. In the non-limiting example, a majority of the plurality of interpretations of the road sign from the plurality of remote vehicles indicate that the amber lights of the road sign are flashing. Therefore, the condition of the if-then clauses (e.g., "amber lights are flashing") has been validated using the third piece of information.

In an exemplary embodiment, the controller 14 uses a visual question answering (VQA) algorithm to evaluate the if-then clauses based on the third piece of information. In the scope of the present disclosure, the VQA algorithm is configured to evaluate the if-then clauses using visual information from an image captured by the camera 26. In the non-limiting example discussed above, the condition of the if-then clauses (e.g., "if amber lights are flashing") is converted to a question (e.g., "are the amber lights flashing?"). By providing the VQA with the question and one or more images captured by the camera 26, the VQA provides an answer which is used to evaluate the if-then clauses. Examples of VQA algorithms include the Bootstrapping Language-Image Pre-training (BLIP) approach and the Contrastive Language-Image Pre-training (CLIP) approach. After block 116, the method 100 proceeds to block 118.

At block 118, a truth score for each of the first and second pieces of information is determined based on the evaluation of the if-then clauses at block 116. In the scope of the present disclosure, the truth score quantifies a certainty that each of the first and second pieces of information is true. In an exemplary embodiment, if evaluation of the if-then clauses performed at block 116 finds either of the first or second pieces of information to be untrue, the relative truth score of that piece of information is reduced. In another exemplary embodiment, the truth score is determined based on a certainty determined from each of the first and second pieces of information. In the non-limiting example described above, an object detection algorithm used to determine whether the amber light is flashing for the first piece of information outputs a certainty score which quantifies a likelihood that the determination of the object detection algorithm is correct. The certainty score from the object detection algorithm used to determine the first piece of information is used as the truth score of the first piece of information. In another exemplary embodiment, the truth score for at least one of the first and second pieces of information is determined based on a number of vehicles contributing to the information. In the non-limiting example described above, one vehicle contributed to the first and second pieces of information, while a plurality of remote vehicles contributed to the third piece of information. Therefore, because the third piece of information was determined to have validated the first piece of information using the if-then clauses evaluation at block 116, the first piece of information is assigned a relatively higher truth score. In yet another exemplary embodiment, the truth scores for each of the first and second pieces of information are determined based on a relative trustworthiness of the information source. In a non-limiting example, information retrieved by accessing vehicle operator manual data is assigned a relatively high truth score. In another non-limiting example, information retrieved using perception sensors (e.g., the camera 26) of the plurality of vehicle sensors 16 may be assigned a higher relative truth score than information retrieved from map data if the map data is outdated. After block 118, the method 100 proceeds to block 120.

At block 120, the truth scores of the first and second pieces of information determined at block 118 are compared. In an exemplary embodiment, if the truth score of the first piece of information is larger than the truth score of the second piece of information, the method 100 proceeds to block 122. If the truth score of the second piece of information is larger than the truth score of the first piece of information, the method 100 proceeds to block 124. If the truth score of the first piece of information is equal to the truth score of the second piece of information, the method 100 proceeds to block 126.

In another exemplary embodiment, if a difference between the truth score of the first piece of information and the truth score of the second piece of information is greater than or equal to a predetermined truth score difference threshold, and the truth score of the first piece of information is greater than the truth score of the second piece of information, the method 100 proceeds to block 122. If the difference between the truth score of the first piece of information and the truth score of the second piece of information is greater than or equal to the predetermined truth score difference threshold and the truth score of the second piece of information is greater than the truth score of the first piece of information, the method 100 proceeds to block 124. If the difference between the truth score of the first piece of information and the truth score of the second piece of information is less than the predetermined truth score difference threshold, the method 100 proceeds to block 126.

At block 122, the contradiction between the first piece of information and the second piece of information is resolved by determining the first piece of information to be true. After block 122, the method 100 proceeds to enter the standby state at block 110.

At block 124, the contradiction between the first piece of information and the second piece of information is resolved by determining the second piece of information to be true. After block 124, the method 100 proceeds to enter the standby state at block 110.

At block 126, the contradiction between the first piece of information and the second piece of information is resolved by prompting the occupant of the vehicle 12 to resolve the contradiction. In an exemplary embodiment, the occupant of the vehicle 12 is prompted using a human-machine interface (e.g., an infotainment system, head-up display system, or the like) of the vehicle 12 to resolve the contradiction between the first and second pieces of information. In a non-limiting example, the occupant is presented with both the first and second pieces of information and is prompted to choose one of the first and second pieces of information to be true. After block 126, the method 100 proceeds to enter the standby state at block 110.

After completion of the method 100, the one of first and second piece of information determined to be true at block 122, 124, or 126 may be used by the controller 14 for further methods or transmitted to further systems. In an exemplary embodiment, the one of first and second piece of information determined to be true at block 122, 124, or 126 is saved in the media 20 of the controller 14.

In an exemplary embodiment, the controller 14 repeatedly exits the standby state 110 and restarts the method 100 at block 102. In a non-limiting example, the controller 14 exits the standby state 110 and restarts the method 100 on a timer, for example, every three hundred milliseconds.

The system 10 and method 100 of the present disclosure offer several advantages. By using the system 10 and the method 100 to resolve information contradictions, the accuracy of self-driving and driver assistance systems is increased. In a first example, a road sign interpretation algorithm (using, for example, optical character recognition) incorrectly interprets a speed limit to be sixty miles per hour based on an image of a road sign captured by the camera 26. Using the system 10 and method 100, the correct speed limit of thirty miles per hour is determined. Thus, the operation of the vehicle 12 may be adjusted, for example, by notifying the occupant of the correct speed limit. In another example, a voice command is received using the microphone 24 to navigate the vehicle 12 to a destination using a highway. However, the occupant has configured a navigation system of the vehicle 12 to avoid highways at night, possibly contradicting with the occupant's request. Using the system 10 and the method 100, an image of the environment 22 surrounding the vehicle 12 is captured using the camera 26. The VQA is used to determine that it is not currently nighttime, and thus the contradiction is resolved. In yet another example, a voice command is received using the microphone 24 to navigate the vehicle 12 a particular direction on a street. However, map data indicates that street is a one-way street, and that the particular direction is a wrong direction on the one-way street. Using the system 10 and the method 100, the contradiction is resolved using a third piece of information, increasing occupant safety.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for resolving information contradictions in information received by a vehicle, the system comprising:
   a plurality of vehicle sensors for receiving the information, wherein the plurality of vehicle sensors includes at least a camera;
   a controller in electrical communication with the plurality of vehicle sensors, wherein the controller is programmed to:
   determine a first piece of information using a first of the plurality of vehicle sensors;
   determine a second piece of information using a second of the plurality of vehicle sensors;
   determine a contradiction status between the first piece of information and the second piece of information, wherein the contradiction status includes a contradicting status and a non-contradicting status;
   construct if-then clauses from one of the first piece of information and the second piece of information in response to determining that the contradiction status is the contradicting status;
   determine a third piece of information using a third of the plurality of vehicle sensors in response to determining that the contradiction status is the contradicting status, wherein the third of the plurality of vehicle sensors is the camera, and wherein the third piece of information includes an image of an environment surrounding the vehicle;
   resolve a contradiction between the first piece of information and the second piece of information to determine a true piece of information by evaluating the if-then clauses using a visual question answering algorithm based on the third piece of information in response to determining that the contradiction status is the contradicting status, wherein the true piece of information is one of: the first piece of information and the second piece of information; and
   adjust an operation of the vehicle based on the true piece of information in response to resolving the contradiction.

2. The system of claim 1, wherein to determine the contradiction status, the controller is further programmed to:
   determine the contradiction status between the first piece of information and the second piece of information using at least a contradiction detection algorithm.

3. The system of claim 2, wherein the contradiction detection algorithm is a transformer model machine learning algorithm.

4. The system of claim 3, wherein the transformer model machine learning algorithm is configured to receive the first piece of information and the second piece of information as inputs and provide a contradiction probability as an output.

5. The system of claim 1, wherein the plurality of vehicle sensors includes at least: a microphone for receiving voice commands from an occupant of the vehicle and a vehicle communication system for communicating with systems external to the vehicle.

6. The system of claim 5, wherein the first, second, and third pieces of information are at least one of: a voice command from the occupant of the vehicle received using the microphone, an image of the environment surrounding the vehicle captured using the camera, and information retrieved from an external system using the vehicle communication system.

7. The system of claim 5, wherein to resolve the contradiction between the first piece of information and the second piece of information, the controller is further programmed to:
   retrieve the third piece of information from the third of the plurality of vehicle sensors, wherein the third piece of information includes at least one of: the image of the environment surrounding the vehicle captured using the camera, information about a remote vehicle in the environment surrounding the vehicle retrieved using the vehicle communication system, and information retrieved from an external system using the vehicle communication system;
   determine a truth score for each of the first and second pieces of information based on evaluating the if-then clauses using the third piece of information; and
   resolve the contradiction based on the truth score for each of the first and second pieces of information.

8. The system of claim 7, wherein to evaluate the if-then clauses, the controller is further programmed to:
   evaluate the if-then clauses using the information about the remote vehicle, wherein the information about the remote vehicle includes at least one of: a speed and a heading of the remote vehicle.

9. The system of claim 7, wherein to evaluate the if-then clauses, the controller is further programmed to:
   evaluate the if-then clauses using the information retrieved from the external system, wherein the information retrieved from the external system includes at least one of: map data, driving law data, and vehicle operator manual data.

10. The system of claim 7, wherein to resolve the contradiction based on the truth score for each of the first and second pieces of information, the controller is further programmed to:
    compare the truth score of the first piece of information to the truth score of the second piece of information;
    determine the first piece of information to be the true piece of information in response to determining that the truth score of the first piece of information is greater than the truth score of the second piece of information and that a difference between the truth score of the first piece of information and the truth score of the second piece of information is greater than or equal to a predetermined truth score difference threshold;
    determine the second piece of information to be the true piece of information in response to determining that the truth score of the second piece of information is greater than the truth score of the first piece of information and that the difference between the truth score of the first piece of information and the truth score of the second piece of information is greater than or equal to the predetermined truth score difference threshold; and
    prompt the occupant of the vehicle with the first piece of information and the second piece of information in response to determining that the difference between the truth score of the first piece of information and the truth score of the second piece of information is less than the predetermined truth score difference threshold.

11. A method for resolving information contradictions for a vehicle, the method comprising:
    determining a first piece of information using a first of a plurality of vehicle sensors;

determining a second piece of information using a second of the plurality of vehicle sensors;

determining a contradiction status between the first piece of information and the second piece of information, wherein the contradiction status includes a contradicting status and a non-contradicting status;

constructing if-then clauses from one of the first piece of information and the second piece of information in response to determining that the contradiction status is the contradicting status;

determining a third piece of information from a third of the plurality of vehicle sensors in response to determining that the contradiction status is the contradicting status, wherein the third of the plurality of vehicle sensors is a camera, and wherein the third piece of information includes an image of an environment surrounding the vehicle; and resolving a contradiction between the first piece of information and the second piece of information to determine a true piece of information by evaluating the if-then clauses using a visual question answering algorithm based on the third piece of information in response to determining that the contradiction status is the contradicting status, wherein the true piece of information is one of: the first piece of information and the second piece of information; and adjusting an operation of the vehicle based on the true piece of information in response to resolving the contradiction.

12. The method of claim 11, wherein determining the contradiction status further comprises:

determining the contradiction status between the first piece of information and the second piece of information using at least a transformer model machine learning algorithm.

13. The method of claim 11, wherein resolving the contradiction between the first piece of information and the second piece of information further comprises:

retrieving the third piece of information from the third of the plurality of vehicle sensors, wherein the third piece of information includes at least one of: the image of the environment surrounding the vehicle captured using a camera, information about a remote vehicle in the environment surrounding the vehicle retrieved using a vehicle communication system, and information retrieved from an external system using the vehicle communication system;

determining a truth score for each of the first and second pieces of information based on evaluating the if-then clauses using the third piece of information; and resolving the contradiction based on the truth score for each of the first and second pieces of information.

14. The method of claim 13, wherein evaluating the if-then clauses further comprises:

evaluating the if-then clauses using the information about the remote vehicle, wherein the information about the remote vehicle includes at least one of: a speed and a heading of the remote vehicle.

15. The method of claim 13, wherein evaluating the if-then clauses further comprises:

evaluating the if-then clauses using the information retrieved from the external system, wherein the information retrieved from the external system includes at least one of: map data, driving law data, and vehicle operator manual data.

16. The method of claim 13, wherein resolving the contradiction based on the truth score for each of the first and second pieces of information further comprises:

comparing the truth score of the first piece of information to the truth score of the second piece of information;

determining the first piece of information to be the true piece of information in response to determining that the truth score of the first piece of information is greater than the truth score of the second piece of information and that a difference between the truth score of the first piece of information and the truth score of the second piece of information is greater than or equal to a predetermined truth score difference threshold;

determining the second piece of information to be the true piece of information in response to determining that the truth score of the second piece of information is greater than the truth score of the first piece of information and that the difference between the truth score of the first piece of information and the truth score of the second piece of information is greater than or equal to the predetermined truth score difference threshold; and prompting an occupant of the vehicle with the first piece of information and the second piece of information in response to determining that the difference between the truth score of the first piece of information and the truth score of the second piece of information is less than the predetermined truth score difference threshold.

17. The method of claim 11, wherein determining the contradiction status further comprises:

determining the contradiction status between the first piece of information and the second piece of information using negation detection by natural language processing (NLP) of the first piece of information and the second piece of information.

18. A system for resolving information contradictions for a vehicle, the system comprising:

a plurality of vehicle sensors, wherein the plurality of vehicle sensors includes a microphone for receiving voice commands from an occupant of the vehicle, a camera for capturing images of an environment surrounding the vehicle, and a vehicle communication system for communicating with systems external to the vehicle; and a controller in electrical communication with the plurality of vehicle sensors, wherein the controller is programmed to:

determine a first piece of information using the microphone;

determine a second piece of information using the vehicle communication system to communicate with an external system;

determine a contradiction status between the first piece of information and the second piece of information using a transformer model machine learning algorithm, wherein the contradiction status includes a contradicting status and a non-contradicting status;

construct if-then clauses from one of the first piece of information and the second piece of information in response to determining that the contradiction status is the contradicting status;

determine a third piece of information using the camera in response to determining that the contradiction status is the contradicting status;

resolve a contradiction between the first piece of information and the second piece of information to determine a true piece of information by evaluating the if-then clauses using a visual question answering algorithm based on the third piece of information in response to determining that the contradiction status is the contradicting status, wherein the true piece of information is one of: the first piece of information and the second piece of information; and adjust an operation of the vehicle based on the true piece of information in response to resolving the contradiction.

19. The system of claim 18, wherein to resolve the contradiction between the first piece of information and the second piece of information, the controller is further programmed to:

determine a truth score for each of the first and second pieces of information based on evaluating the if-then clauses using the third piece of information; and compare the truth score of the first piece of information to the truth score of the second piece of information, wherein one of the first and second pieces of information having a larger truth score is determined to be the true piece of information in response to determining that a difference between the truth score of the first piece of information and the truth score of the second piece of information is greater than or equal to a predetermined truth score difference threshold, and wherein an occupant of the vehicle is prompted in response to determining that the first and second pieces of information have equal truth scores.

20. The system of claim 19, wherein to evaluate the if-then clauses, the controller is further programmed to:

evaluate the if-then clauses based at least in part on at least one of:

information about a remote vehicle, wherein the information about the remote vehicle includes at least one of: a speed and a heading of the remote vehicle; and information retrieved from an external system, wherein the information retrieved from the external system includes at least one of: map data, driving law data, and vehicle operator manual data.

\* \* \* \* \*